United States Patent
Bailey et al.

(10) Patent No.: US 11,536,388 B2
(45) Date of Patent: Dec. 27, 2022

(54) MAGNETIC LATCHING VALVE AND METHOD OF CONTROL

(71) Applicant: Norgren GT Development LLC, Auburn, WA (US)

(72) Inventors: Richard Bailey, Auburn, WA (US); Levi Danzer, Auburn, WA (US)

(73) Assignee: Norgren GT Development LLC, Auburn, WA (US)

( * ) Notice: Subject to any disclaimer, the term of this patent is extended or adjusted under 35 U.S.C. 154(b) by 0 days.

(21) Appl. No.: 17/396,830

(22) Filed: Aug. 9, 2021

(65) Prior Publication Data
US 2022/0042619 A1 Feb. 10, 2022

Related U.S. Application Data

(60) Provisional application No. 63/063,776, filed on Aug. 10, 2020.

(51) Int. Cl.
*F16K 31/06* (2006.01)
*F16K 31/08* (2006.01)
*F16K 11/06* (2006.01)

(52) U.S. Cl.
CPC .......... *F16K 31/0627* (2013.01); *F16K 31/08* (2013.01); *F16K 31/082* (2013.01); *F16K 31/084* (2013.01); *F16K 11/06* (2013.01); *F16K 31/0606* (2013.01)

(58) Field of Classification Search
CPC ............. F16K 31/0606; F16K 31/0627; F16K 31/082; F16K 31/08; F16K 31/084; F16K 11/06

See application file for complete search history.

(56) References Cited

U.S. PATENT DOCUMENTS

| | | | |
|---|---|---|---|
| 3,368,788 A * | 2/1968 | Padula | H01F 7/1646 251/65 |
| 3,379,214 A * | 4/1968 | Weinberg | F16K 31/082 137/625.5 |
| 3,683,239 A | 8/1972 | Sturman | |
| 4,383,234 A | 5/1983 | Yatsushiro et al. | |

(Continued)

FOREIGN PATENT DOCUMENTS

EP    2 064 472 B1    8/2016

OTHER PUBLICATIONS

Search Report prepared by the UK Intellectual Property Office in application No. GB2012641.3 dated Dec. 4, 2020.

*Primary Examiner* — Umashankar Venkatesan
(74) *Attorney, Agent, or Firm* — McDonnell Boehnen Hulbert & Berghoff LLP

(57) ABSTRACT

An example system includes a valve assembly having: (i) a plurality of ports including an inlet port, an outlet port, and a vent port, (ii) a solenoid coil having a cavity therein, (iii) an armature slidably accommodated in the cavity of the solenoid coil, (iv) a magnet fixedly disposed within the solenoid coil, wherein the magnet applies a magnetic force on the armature in a distal direction, and (v) a spring applying a biasing force on the armature in a proximal direction; and a controller sending a signal having a particular polarity to the solenoid coil such that the signal is applied to the solenoid coil for a particular period of time, and resending the signal periodically every particular time interval.

20 Claims, 7 Drawing Sheets

(56) References Cited

U.S. PATENT DOCUMENTS

| | | | | |
|---|---|---|---|---|
| 4,403,765 | A * | 9/1983 | Fisher | H01F 7/1646 |
| | | | | 335/266 |
| 4,559,971 | A * | 12/1985 | Bradshaw | F16K 31/082 |
| | | | | 137/596.17 |
| 6,546,959 | B2 | 4/2003 | Cross et al. | |
| 6,791,442 | B1 | 9/2004 | Schmidt | |
| 6,860,292 | B2 | 3/2005 | Fasolino et al. | |
| 10,253,900 | B2 * | 4/2019 | Jefford | F16K 31/0655 |
| 11,220,151 | B1 * | 1/2022 | Xin | B60G 17/0526 |
| 2003/0155022 | A1 * | 8/2003 | Weiss | F16K 27/029 |
| | | | | 137/884 |
| 2006/0097830 | A1 | 5/2006 | Forsythe et al. | |
| 2012/0017997 | A1 | 1/2012 | Ho | |
| 2012/0279589 | A1 | 11/2012 | Morris et al. | |
| 2022/0074371 | A1 * | 3/2022 | Lucka | F16K 31/0624 |

\* cited by examiner

700 ⟶

┌─────────────────────────────────────────────────────────────────────┐
│ RECEIVING A FIRST REQUEST TO OPERATE A VALVE ASSEMBLY IN A FIRST    │
│ COMMANDED STATE, WHEREIN THE VALVE ASSEMBLY COMPRISES: (I) A MANIFOLD│
│ HAVING AN INLET PORT AND AN OUTLET PORT, (II) A SOLENOID COIL COUPLED TO │
│ THE MANIFOLD, WHEREIN THE SOLENOID COIL INCLUDES A CAVITY THEREIN AND│
│ COMPRISES A VENT PORT, (III) AN ARMATURE SLIDABLY ACCOMMODATED IN THE│
│ CAVITY OF THE SOLENOID COIL, (IV) A PROXIMAL POLE PIECE AND A DISTAL POLE │ 702
│ PIECE, (V) A MAGNET INTERPOSED BETWEEN THE PROXIMAL POLE PIECE AND THE│
│ DISTAL POLE PIECE, WHEREIN THE MAGNET APPLIES A MAGNETIC FORCE ON THE│
│ ARMATURE IN A DISTAL DIRECTION, AND (VI) A SPRING APPLYING A BIASING FORCE│
│ ON THE ARMATURE IN A PROXIMAL DIRECTION                              │
└─────────────────────────────────────────────────────────────────────┘

┌─────────────────────────────────────────────────────────────────────┐
│ RESPONSIVELY, SENDING A FIRST SIGNAL HAVING A FIRST POLARITY TO THE │
│ SOLENOID COIL SUCH THAT THE FIRST SIGNAL IS APPLIED TO THE SOLENOID COIL│
│ FOR A FIRST PERIOD OF TIME (AND THE FIRST SIGNAL IS THEN REMOVED), THEREBY│
│ CAUSING A SOLENOID FORCE TO BE APPLIED TO THE ARMATURE IN THE DISTAL│
│ DIRECTION, WHEREIN A COMBINATION OF THE MAGNETIC FORCE AND THE SOLENOID│
│ FORCE OVERCOME THE BIASING FORCE, CAUSING THE ARMATURE TO MOVE AXIALLY│
│ IN THE DISTAL DIRECTION TO A FIRST POSITION (THE LATCHED POSITION), THEREBY │ 704
│ ALLOWING FLUID FLOW FROM THE INLET PORT TO THE OUTLET PORT, WHEREIN │
│ WHEN THE ARMATURE IS IN THE FIRST POSITION, THE MAGNETIC FORCE OF THE│
│ MAGNET IS GREATER THAN THE BIASING FORCE, AND THE ARMATURE REMAINS IN│
│ THE FIRST POSITION UPON REMOVAL OF THE FIRST SIGNAL                 │
└─────────────────────────────────────────────────────────────────────┘

┌─────────────────────────────────────────────────────────────────────┐
│ RESENDING THE FIRST SIGNAL PERIODICALLY EVERY FIRST TIME INTERVAL, WHEREIN│
│ THE FIRST TIME INTERVAL IS GREATER THAN THE FIRST PERIOD OF TIME    │
└─────────────────────────────────────────────────────────────────────┘
                                                                    706

FIG. 7

MAGNETIC LATCHING VALVE AND METHOD OF CONTROL

CROSS REFERENCE TO RELATED APPLICATION

The present application claims priority to U.S. Provisional Application No. 63/063,776 filed on Aug. 10, 2020, the entire contents of which are herein incorporated by reference as if fully set forth in this description.

BACKGROUND

A valve is a device that directs the flow of a fluid medium (e.g., air, gas, or hydraulic fluid) through a fluid system. The direction of the fluid flow is determined by the position of a movable element such as a spool, piston, or poppet.

An example valve may have a spool that is movable by an actuation mechanism (e.g., electric, hydraulic, pneumatic, or manual). Once the valve is actuated, the spool moves to allow fluid flow from a first port to a second port.

In some applications, it may be desirable to keep the valve operating in a given commanded state when an actuation signal is removed. This way, if there is a failure that causes the actuation signal to be cut off, the fluid system operates safely at the commanded state of the valve. It may also be desirable to reduce the potential that the environmental conditions of the valve disturb the valve and cause the valve state to change unintentionally. It is with respect to these and other considerations that the disclosure made herein is presented.

SUMMARY

The present disclosure describes implementations that relate to a magnetic latching valve and method of control.

In a first example implementation, the present disclosure describes a system. The system includes a valve assembly comprising: (i) a plurality of ports including an inlet port, an outlet port, and a vent port, (ii) a solenoid coil having a cavity therein, (iii) an armature slidably accommodated in the cavity of the solenoid coil, (iv) a magnet fixedly disposed within the solenoid coil, wherein the magnet applies a magnetic force on the armature in a distal direction, and (v) a spring applying a biasing force on the armature in a proximal direction. The system also includes a controller configured to perform operations comprising: (i) sending a signal having a particular polarity to the solenoid coil such that the signal is applied to the solenoid coil for a particular period of time, thereby causing a solenoid force to be applied to the armature in the proximal direction, wherein a combination of the biasing force of the spring and the solenoid force overcome the magnetic force, causing the armature to move axially in the proximal direction to a particular position, thereby allowing fluid flow from the outlet port to the vent port, while blocking fluid flow from the inlet port to the outlet port, and wherein when the armature is in the particular position, the magnetic force of the magnet is smaller than the biasing force, and the armature remains in the particular position upon removal of the signal; and (ii) resending the signal periodically every particular time interval, wherein the particular time interval is greater than the particular period of time.

In a second example implementation, the present disclosure describes a method. The method includes (i) receiving a request to operate a valve assembly in a commanded state, wherein the valve assembly comprises: (a) a plurality of ports including an inlet port, an outlet port, and a vent port, (b) a solenoid coil having a cavity therein, (c) an armature slidably accommodated in the cavity of the solenoid coil, (d) a magnet fixedly disposed within the solenoid coil, wherein the magnet applies a magnetic force on the armature in a distal direction, and (e) a spring applying a biasing force on the armature in a proximal direction; (ii) responsively, sending a signal having a particular polarity to the solenoid coil such that the signal is applied to the solenoid coil for a particular period of time, thereby causing a solenoid force to be applied to the armature in the distal direction, wherein a combination of magnetic force and the solenoid force overcome the biasing force of the spring, causing the armature to move axially in the distal direction to a particular position, thereby allowing fluid flow from the inlet port to the outlet port, while blocking fluid flow from the outlet port to the to the vent port, and wherein when the armature is in the particular position, the magnetic force of the magnet is greater than the biasing force, and the armature remains in the particular position upon removal of the signal; and (iii) resending the signal periodically every particular time interval, wherein the particular time interval is greater than the particular period of time.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 7 is a flowchart of a method for operating a valve assembly, in accordance with an example implementation.

DETAILED DESCRIPTION

In a fluid control system, valves are used to control fluid flow to and from one or more actuators. The term "fluid" is used herein generally to indicate air, gas, liquid, hydraulic fluid, water, fuel, etc. In the description below, air is used as an example; however, it should be understood that the valves and system described herein may also be used with other fluid types.

Valves can be actuated, for example, via an electric signal. An example valve includes a solenoid actuator having a solenoid coil that when energized causes a movable element, such as a spool, to move to direct fluid from a source of fluid to an actuator. An example valve may be configured to continually receive electric power to maintain the valve operating in a commanded state, and such continual electric power to the solenoid coil may cause the solenoid coil to overheat. Further, loss of power to the solenoid coil, for any reason, may cause an undesirable change in the state of the valve, which in turn may cause undesirable or un-commanded operations to occur.

As an example for illustration, some trucks are provided with an air-operated suspension system. The driver of the truck may wish to park the truck at a loading dock, actuate a valve to dump the air in the suspension system, and at the same time turn off the ignition and leave the truck in this state for a long period of time. As another example, a valve can control fluid flow to an actuator (e.g., pneumatic) that operates a bed of the truck. A solenoid coil of the valve is energized to allow the valve to allow fluid flow to the actuator and raise the bed of the truck, and the drive may then turn off the ignition of the truck.

It may be desirable upon turning off the ignition, causing the solenoid coil to be de-energized, that the valve does not change its state to avoid the suspension system to return to a suspended position or the truck bed to "drop" undesirably. However, it might not be desirable to leave the solenoid coil continually-energized to avoid overheating the solenoid coil or draining of the battery in the truck.

It may thus be desirable to configure the valve such that the valve remains in a commanded state despite removing or losing the electric signal to the solenoid coil. Further, under some conditions, e.g., when the truck is vibrating or subjected to shock loads, the valve may unintentionally change its state of operation. It may thus further be desirable to maintain the valve operating in the commanded state despite changes in the conditions of the environment of the valve and fluid system.

Disclosed herein are systems and method of control that may allow a valve to remain in a commanded state despite removing or losing an electric signal to a solenoid coil of the valve. The disclosed methods may further reduce the likelihood or potential that the valve changes its commanded state unintentionally due to environmental conditions of the valve.

Figure 1:
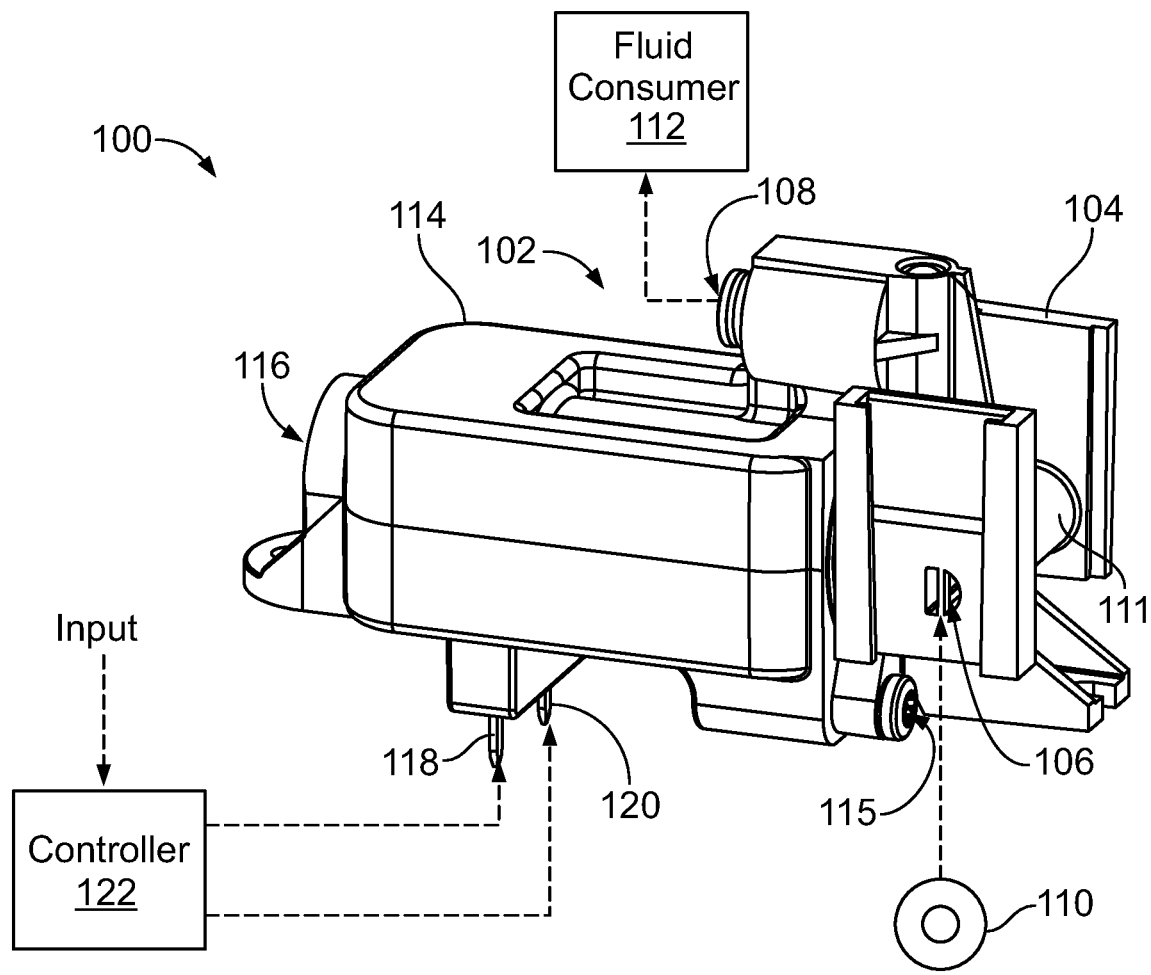
FIG. 1 illustrates a system comprising a valve assembly, in accordance with an example implementation.

FIG. 1 illustrates a system 100 comprising a valve assembly 102, in accordance with an example implementation. The valve assembly 102 includes a manifold 104 having a supply or inlet port 106 and an outlet port 108.

The system 100 includes a source 110 of fluid that is fluidly coupled to the inlet port 106 of the manifold 104. The source 110 can, for example, be a pump, air compressor, an accumulator, an actuator discharging fluid, etc. The fluid from the source 110 is communicated via the inlet port 106 through a lateral bore or lateral channel within a cylindrical portion 111 of the manifold 104.

The system 100 further includes a fluid consumer 112. The fluid consumer 112 can, for example, be an actuator (e.g., a pneumatic cylinder) or any other device that operates based on pressurized fluid (e.g., compressed air). In another example, the fluid consumer 112 is a fluid reservoir or tank.

The manifold 104 is coupled to a solenoid coil 114 via fasteners such as screw 115. The solenoid coil 114 is an encapsulated or over-molded coil configured as a valve body or housing that contains other components of the valve assembly 102. The solenoid coil 114 defines an exhaust or vent port 116.

The solenoid coil 114 is electrically-coupled to a terminal 118 and a terminal 120. Electric power provided to the terminals 118, 120 energizes the solenoid coil 114.

The system 100 further a controller 122 that is configured to provide electric signals to the terminals 118, 120 based on input signals (e.g., operator commands or commands from a main controller of a vehicle). In an example, the controller 122 is electrically-coupled to the terminals 118, 120 or a communication bus, e.g., Communication Area Network (CAN) bus, which facilitates transmission of signals between various components of the system 100. The valve assembly 102 controls fluid flow from the source 110 to the fluid consumer 112 based on command signals provided by the controller 122.

The controller 122 is an electronic controller that includes one or more processors or microprocessors and may include data storage (e.g., memory, transitory computer-readable medium, non-transitory computer-readable medium, etc.). The data storage may have stored thereon instructions that, when executed by the one or more processors of the controller 122, cause the controller 122 to perform operations described herein.

Figure 2:
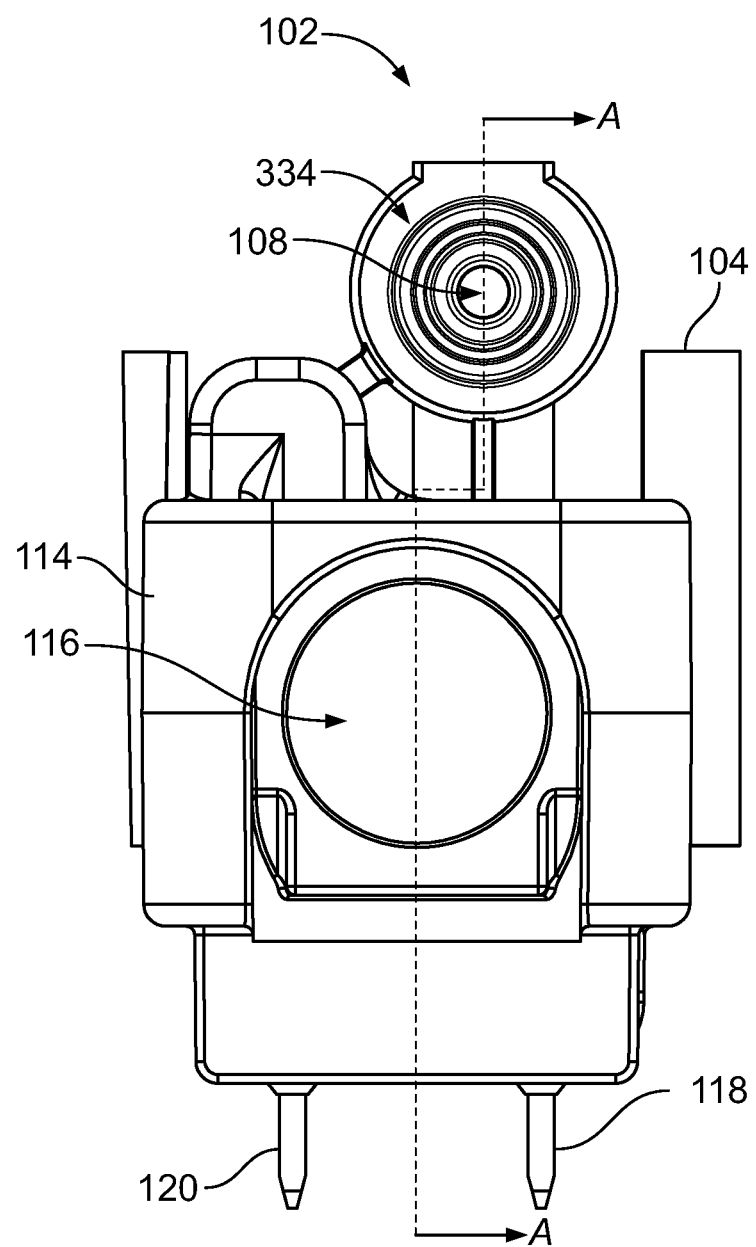
FIG. 2 illustrates a front view of the valve assembly of FIG. 1, in accordance with an example implementation.
Figure 3:
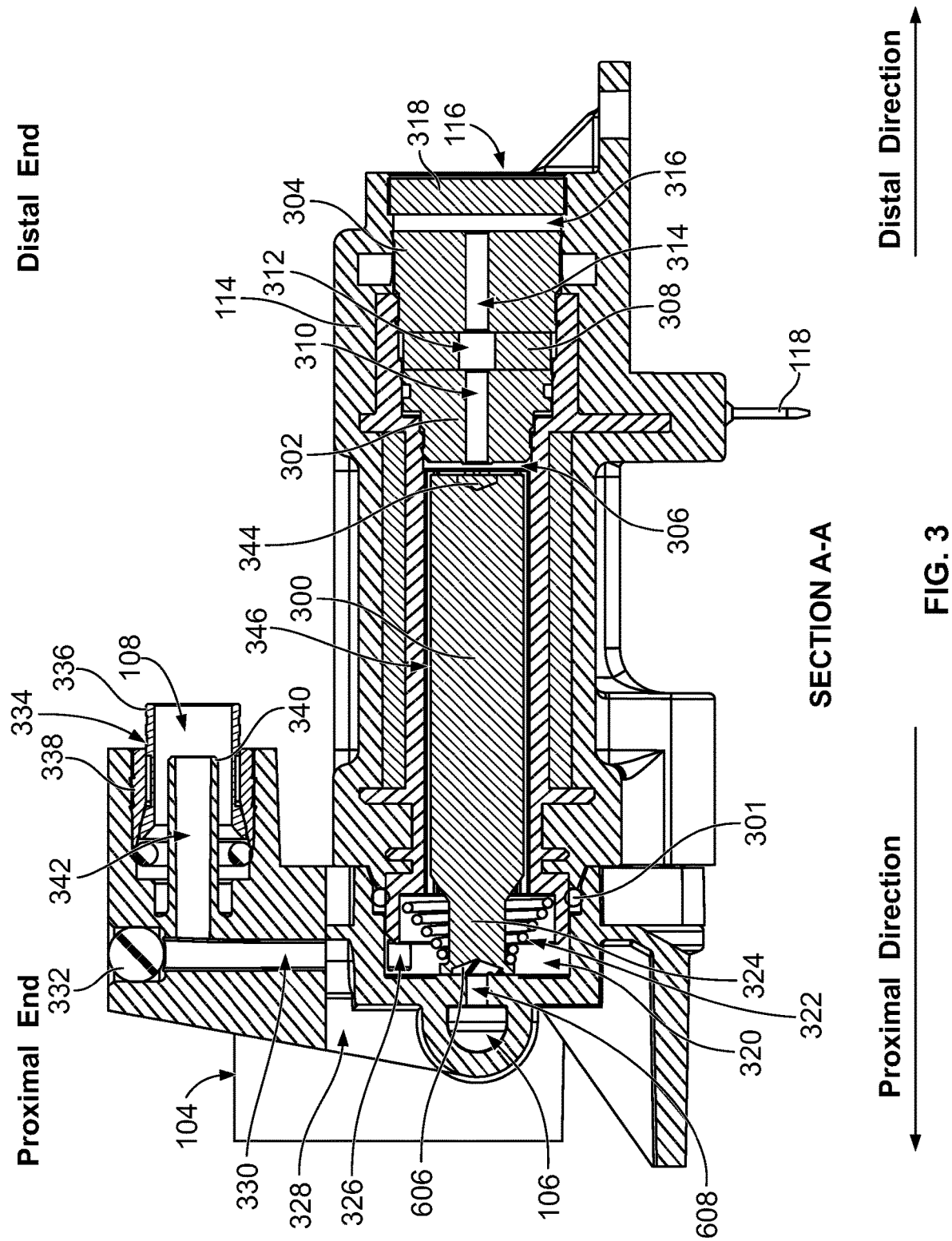
FIG. 3 illustrates a cross-sectional side view of the valve assembly of FIG. 1, in accordance with an example implementation.
Figure 4:
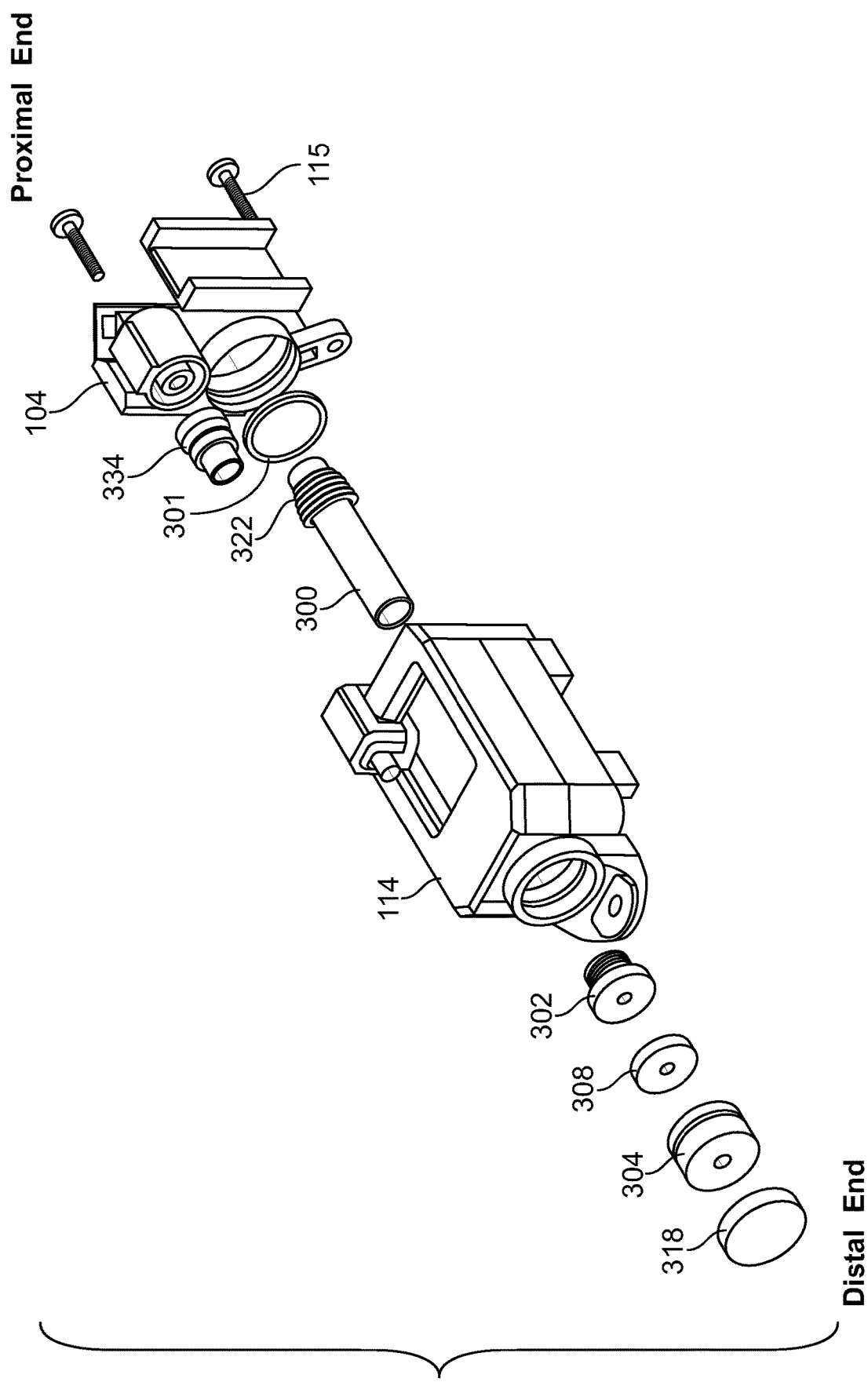
FIG. 4 illustrates a perspective exploded view of the valve assembly of FIG. 1, in accordance with an example implementation.

FIG. 2 illustrates a front view of the valve assembly 102, FIG. 3 illustrates a cross-sectional side view of the valve assembly 102, and FIG. 4 illustrates a perspective exploded view of the valve assembly 102, in accordance with an example implementation. FIGS. 2-4 are described together.

As depicted in FIG. 3, the manifold 104 is coupled to the solenoid coil 114 and a seal 301 (e.g., an O-ring) is disposed between the exterior surface of the solenoid coil 114 and the interior surface of the manifold 104. The seal 301 is configured to seal the manifold 104 to the solenoid coil 114 to preclude leakage to an external environment of the valve assembly 102.

The solenoid coil 114 includes a longitudinal cylindrical cavity therein. The valve assembly 102 includes an armature 300 that is slidably accommodated within the longitudinal cylindrical cavity. The term "slidably accommodated" is used herein to indicate that the armature 300 is axially movable within the solenoid coil 114.

The armature 300 can also be referred to as a plunger or spool. The armature 300 operates as an iron core that enhances the magnetic field and the electromagnetic force generated by the solenoid coil 114 when the solenoid coil 114 is energized. Example materials from which the armature 300 can be made include soft iron, manganese, cobalt, a metallic oxide, iron alloy such as manganese zinc ferrites, etc.

The valve assembly 102 further includes a segmented pole piece comprising an inner or proximal pole piece 302 and an outer or distal pole piece 304. Both the proximal pole piece 302 and the distal pole piece 304 are disposed at a distal side of the armature 300. In the state shown in FIG. 3, the armature 300 is separated from the proximal pole piece 302 by an airgap 306.

The pole pieces 302, 304 are made of a material of high magnetic permeability (e.g., ferromagnetic material) and operate as a magnet when an electric current is applied to the windings of the solenoid coil 114. The pole pieces 302, 304 are fixedly disposed within the solenoid coil 114.

Figure 5:
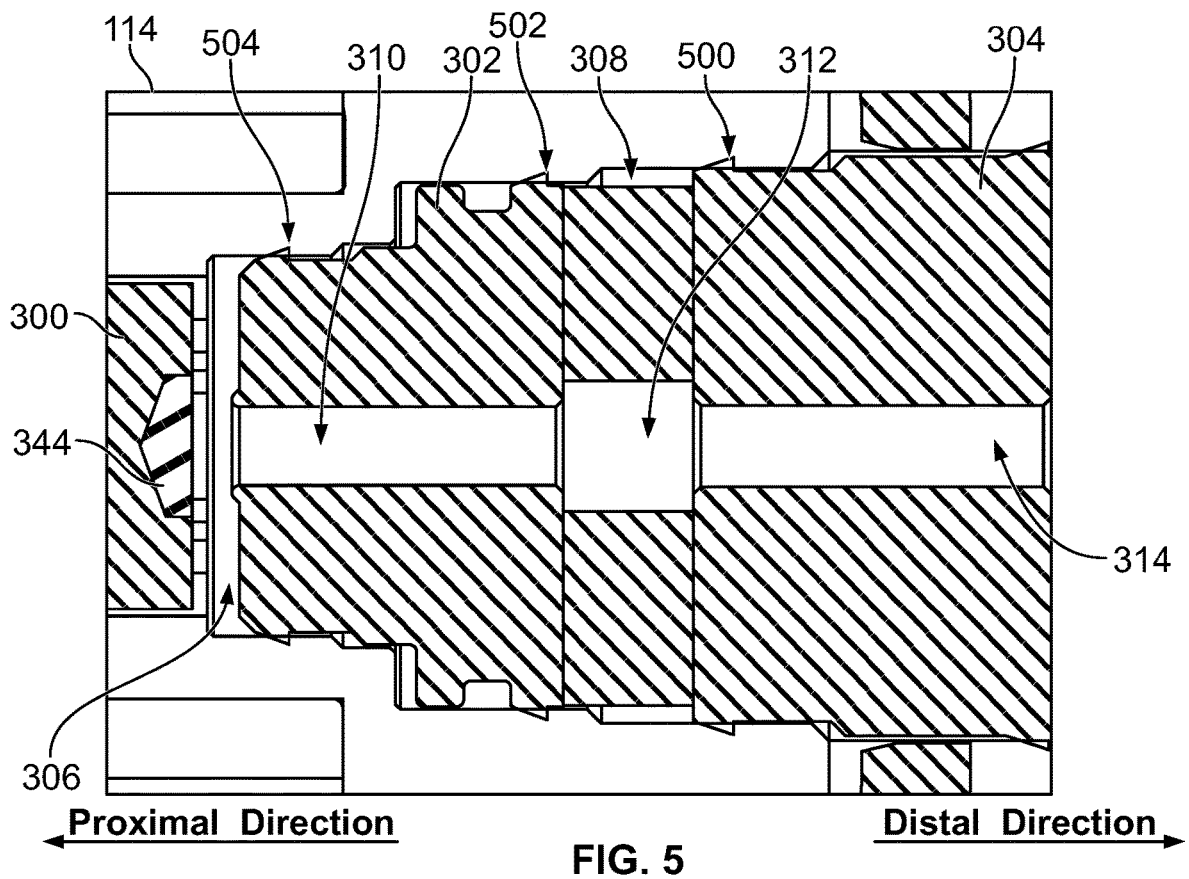
FIG. 5 illustrates a partial cross-sectional bottom view of a distal end of the valve assembly, in accordance with an example implementation.

FIG. 5 illustrates a partial cross-sectional bottom view of a distal end of the valve assembly 102, in accordance with an example implementation. The pole pieces 302, 304 can be fixedly mounted within the longitudinally cavity of the solenoid coil 114 via different methods. In the example implementation shown in FIG. 5, the pole pieces 302, 304 are barbed, and their barbs allow them to be press-fitted within the solenoid coil 114 and remain secured therein.

Particularly, the distal pole piece 304 can have barb 500 and the proximal pole piece has barb 502 and barb 504. Each of the barbs 500-504 can include one or more continuous ridges or bumps on the respective pole piece, and the barbs 500-504 operate as a grip that securely mounts the pole pieces 302, 304 within the solenoid coil 114. As the pole pieces 302, 304 are inserted into the solenoid coil 114 in a proximal direction, they can be slightly compressed, and then once the pole pieces 302, 304 are in position, they grip the interior surface of the solenoid coil 114 and secure the pole pieces 302, 304 in position. The number, spacing, and configuration of the barbs 500, 502, and 504 depicted in the Figures are an example for illustration, and a different number and spacing of barbs can be used.

Referring back to FIGS. 3-4, the valve assembly 102 further includes a magnet 308 securely interposed between the proximal pole piece 302 and the distal pole piece 304. The magnet 308 is a permanent magnet, i.e., a magnet that retains its magnetism after it is removed from a magnetic field. As an example, the magnet 308 is made of an iron alloy, which in addition to iron, may include aluminum (Al), nickel (Ni), and cobalt (Co). In another example, the magnet 308 is an N40 grade rare-earth magnets such as a neodymium magnet, which is a rare earth permanent magnet made from an alloy of neodymium, iron and boron.

As depicted in the Figures, the magnet 308 is ring-shaped. Further, the magnet 308 is axially-magnetized (as opposed to being diametrically magnetized). In the example implementation described herein, the north pole of the magnet 308 faces or is oriented in the distal direction toward the distal pole piece 304, whereas the south pole of the magnet 308 faces in the proximal direction toward the proximal pole piece 302. As such, the magnet 308 is magnetized through its width or thickness.

With this configuration, the magnet 308 generates a magnetic field that causes a magnetic force to be applied on the armature 300 in the distal direction. The magnitude of the magnetic force applied by the magnet 308 varies with the axial distance between the magnet 308 and the armature 300. Particularly, the magnitude of the magnetic force applied by the magnet 308 on the armature 300 is inversely proportional to the square of the axial distance therebetween.

The proximal pole piece 302 has a channel 310 aligned with a hole 312 of the magnet 308 (which is ring-shaped) and a respective channel 314 of the distal pole piece 304. The channel 310, the hole 312, and the channel 314 together form a fluid passage that fluidly couples the airgap 306 to a gap 316 that separates the distal pole piece 304 from a porous plug 318. The term "fluidly couple" is used herein to indicate that fluid can flow or be communicated between two fluid passages, chambers, ports, or openings.

The porous plug 318 is used as a control element of gas flow from the gap 316 to the vent port 116, which is subjected to an external environment of the valve assembly 102. In an example, the porous plug 318 includes a number of tubes with small cross-sectional areas, permitting molecular flow of gas when pressurized gas is communicated to the gap 316. In an example, the pore size of the pores of the porous plug 318 is about 1 micrometer (μm). Such pore size is obtained by sintering nonmetallic (e.g., glass) or metallic powders. In another example, the porous plug 318 is made of a sintered high alumina ceramic material that has controlled porosity to allow for gas flow. As the distal end of the porous plug 318 is subjected to atmospheric pressure or low environmental pressure, the porous plug 318 might not allow reverse flow from the vent port 116 to the gap 316.

As depicted in FIG. 3, an inner chamber 320 is formed between or enclosed by the manifold 104 and the proximal end of the solenoid coil 114. The inner chamber 320 includes a spring 322 disposed about a reduced-diameter portion 324 of the armature 300.

Figure 6:
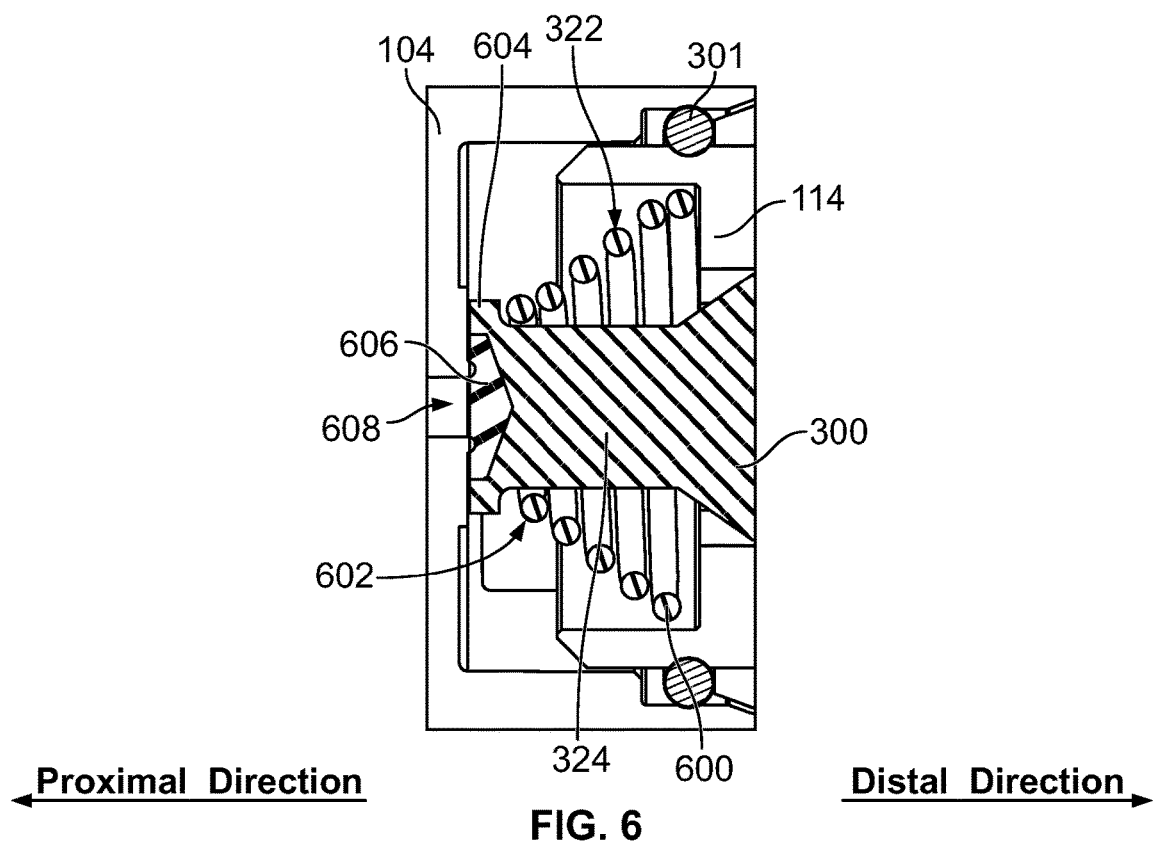
FIG. 6 illustrates a partial cross-sectional bottom view of a proximal end of the valve assembly, in accordance with an example implementation.

FIG. 6 illustrates a partial cross-sectional bottom view of a proximal end of the valve assembly 102, in accordance with an example implementation. In the example implementation depicted in FIG. 6, the spring 322 is configured as a conical spring that is coiled in increasing outer diameter in the distal direction. In other words, the spring 322 is tapered and has the shape of a cone. With this configuration, the spring 322 can apply a particular spring force at a reduced solid height compared to a non-conical spring, and may provide enhanced stability.

A distal end of the spring 322, and particularly a largest-diameter coil 600 thereof, rests against an interior surface of the solenoid coil 114. On the other hand, a proximal end of the spring 322, and particularly a smallest-diameter coil 602 thereof, rests against an armature lip or armature flange 604 formed at the proximal end of the armature 300.

As such, the distal end of the spring 322 is fixedly disposed on the interior surface of the solenoid coil 114, whereas the proximal end of the spring 322 rests against the armature flange 604. This way, the spring 322 applies a biasing spring force on the armature 300 in the proximal direction.

As mentioned above, the magnitude of the magnetic force applied by the magnet 308 on the armature 300 in the distal direction varies with the axial distance between the magnet 308 and the armature 300. In the axial position of the armature 300 depicted in FIGS. 3, 5-6, the spring force of the spring 322 acting on the armature 300 in the proximal direction is greater than the magnetic force applied by the magnet 308 on the armature 300. Therefore, the armature 300 is biased in the proximal direction toward the axial position shown in FIGS. 3, 5-6.

As shown in FIG. 6, the armature 300 includes or houses a seal element 606 disposed or enclosed within the proximal end of the armature 300. The seal element 606 can be made of a compressible, flexible material. In the axial position of the armature 300 shown in FIGS. 3 and 6, the seal element 606 is compressed under the biasing force of the spring 322 on the armature 300 to effectively seal a longitudinal channel 608 formed in the manifold 104. The longitudinal channel 608 is fluidly coupled to or in communication with the inlet port 106 via the lateral channel formed in the cylindrical portion 111 of the manifold 104 (see FIG. 1).

Referring to FIG. 3, the manifold 104 includes one or more holes or windows, such as window 326, which fluidly couple the inner chamber 320 to an outer chamber 328 formed within the manifold 104. The manifold 104 further includes a channel 330 that is in fluid communication with the outer chamber 328. A ball 332 can be pressed onto the manifold 104 after a drill is used to drill the channel 330.

As depicted in FIG. 3, the valve assembly 102 can include a fitting or cartridge 334 coupled to the outlet port 108 of the manifold 104. The cartridge 334 facilitates coupling a fluid line (e.g., a tube, hose, or pipe) from the fluid consumer 112 (see FIG. 1) to the outlet port 108, thereby fluidly coupling the valve assembly 102 to the fluid consumer 112.

In an example, the cartridge 334 includes a collet 336 that has the opening associated with the outlet port 108. The collet 336 is configured to be inserted into or "ride on" a sleeve 338 to be coupled thereto. For instance, the collet 336 can be threaded into the sleeve 338, or can have barbs that allow the collet 336 to be press-fitted or interference-fitted to the sleeve 338. The sleeve 338 is coupled to the manifold 104 (e.g., via threads or barbed interference fit). The cartridge 334 further includes a tube support 340 that is configured to be coupled to the fluid line connecting the valve assembly 102 to the fluid consumer 112.

The tube support 340 is hollow and has a channel 342 formed therein that is in communication with the channel 330 of the manifold 104. With this configuration, the outlet port 108 is fluidly coupled to the inner chamber 320 via the channel 342, the channel 330, the outer chamber 328, and the window 326. The configuration or the cartridge 334 used herein is an example for illustration. Other types of fitting can be used to fluidly couple the outlet port 108 to the fluid consumer 112.

The valve assembly 102 is configured to operate in at least two commanded states based on a polarity of the electric power provided to the solenoid coil 114. The valve assembly 102 operates in a first commanded state when direct current (DC) electric power having a first electric polarity is provided to the solenoid coil 114. For example, DC power or a DC signal with the first electric polarity is provided to the valve assembly 102 when the positive terminal of a power source (e.g., a battery) is connected to the terminal 120 while the negative terminal of the power source is connected to the terminal 118. In other words, the DC signal with the first polarity is provided to the valve assembly 102 when the controller 122 communicates the DC signal to the valve assembly 102 such that the positive voltage of the DC signal is applied to the terminal 120 while the negative voltage is applied or connected to the terminal 118.

When the DC signal with the first polarity is provided through the windings of the solenoid coil 114, a magnetic field is generated. The pole pieces 302, 304 direct the magnetic field through the airgap 306 toward the armature 300, which is movable and is attracted toward the pole pieces 302, 304. In other words, when an electric current with the first polarity is applied to the solenoid coil 114, the generated magnetic field forms a north and south pole in the pole pieces 302, 304 and the armature 300, and therefore the pole pieces 302, 304 and the armature 300 are attracted to each other. Because the pole pieces 302, 304 are fixed while the armature 300 is movable, the armature 300 is attracted to the pole piece 302, 304 and is movable across the airgap 306 toward the pole pieces 302, 304. Thus, when the DC signal with the first polarity is provided to the solenoid coil 114, a solenoid force acting in the distal direction is generated and is applied to the armature 300, thereby attracting the armature 300 toward the pole pieces 302, 304, i.e., the armature 300 is attracted toward the distal direction.

When the solenoid force overcomes the biasing force of the spring 322 and friction forces, the armature 300 moves axially in the distal direction. As the armature 300 moves in the distal direction, the spring 322 is compressed and its biasing force acting in the proximal direction increases. However, as the armature 300 moves in the distal direction, it becomes closer to the magnet 308, and therefore the magnetic force applied by the magnet 308 on the armature 300 in the distal direction increases.

Thus, three forces are acting on the armature 300: (i) the biasing force of the spring 322 acting in the proximal direction, (ii) the electromagnetic force or solenoid force generated by energizing the solenoid coil 114 (with the first polarity DC signal) acting in the distal direction, and (iii) the magnetic force of the magnet 308 acting in the distal direction.

As the armature 300 moves closer to the magnet 308, the combined solenoid and magnetic forces cause the armature 300 to traverse the airgap 306, and distal end face of the armature 300 rests against the proximal end face of the proximal pole piece 302. Also, as the armature 300 moves closer to the magnet 308 and the magnetic force of the magnet 308 increases, the magnetic force becomes greater than the biasing force of the spring 322. As such, the DC signal to the solenoid coil 114 can be removed, and the armature 300 stays "latched" to the proximal pole piece 302 in a stable position.

With this configuration, the first polarity electric signal from the controller 122 can be applied to the solenoid coil 114 for a particular period of time to move the armature 300 and can then be removed, while the armature 300 remains latched to the proximal pole piece 302 due to the magnetic force of the magnet 308. As an example for illustration, the controller 122 applies a 16 volts (V) DC signal for a period of about 100 milliseconds (ms) to the solenoid coil 114 and the DC signal can then be removed, while the armature 300 remains latched or secured against the proximal pole piece 302. This way, power loss does not affect the commanded state of the valve assembly 102.

As such, the first commanded state achieved when a DC signal with the first polarity is provided to the solenoid coil 114 can be referred to as a "latched state." At the latched state, the armature 300 is secured against the proximal pole piece 302. As depicted in FIG. 3, the armature 300 includes or houses another seal element 344 within the distal end of the armature 300. Similar to the seal element 606, the seal element 344 can be made of a flexible, compressible material such that when the armature 300 presses against the proximal pole piece 302, the seal element 344 is compressed to effectively seal the channel 310 of the proximal pole piece 302.

On the other hand, the proximal end of the armature 300 disengages from the interior surface of the manifold 104 and the longitudinal channel 608 is exposed (i.e., the seal element 606 no longer seals the longitudinal channel 608). As a result, pressurized fluid provided from the source 110 of fluid to the inlet port 106 flows through the lateral channel in the cylindrical portion 111 of the manifold 104, then flows through the longitudinal channel 608 to the inner chamber 320, then through the window 326 to the outer chamber 328, then through the channel 330 and the channel 342 and through the outlet port 108 to the fluid consumer 112 that is fluidly coupled to the outlet port 108.

As such, in the first commanded state, fluid is allowed to flow from the source 110 to the fluid consumer 112. The valve assembly 102 operates in the first commanded state until a command DC signal with a second polarity (opposite the first polarity) is applied to the solenoid coil 114.

For example, a DC signal with the second polarity is provided to the valve assembly 102 when positive voltage of the DC signal is applied to the terminal 118 while the negative voltage is applied to the terminal 120. When the DC signal with the second polarity is provided through the windings of the solenoid coil 114, the magnetic field generated has an opposite polarity compared to when the DC signal with the first polarity is provided to the solenoid coil 114.

As a result, when the DC signal with the second polarity is provided through the windings of the solenoid coil 114, the armature 300 is repelled away from the pole pieces 302, 304. Thus, in the second commanded state, three forces are acting on the armature 300: (i) the biasing force of the spring 322 acting in the proximal direction, (ii) the electromagnetic force or solenoid force generated by energizing the solenoid coil 114 (with the second polarity DC power) also acting in the proximal direction and is additive to the biasing force of the spring 322, and (iii) the magnetic force of the magnet 308 acting in the distal direction.

The combined spring force of the spring 322 and the solenoid force overcome the magnetic force of the magnet 308, causing the armature 300 to be "unlatched" from the proximal pole piece 302 and move back to the axial position depicted in FIGS. 3 and 5-6. As the armature 300 moves away from the magnet 308, the magnetic force of the magnet 308 decreases and becomes smaller than the biasing force of the spring 322. As such, the DC signal to the solenoid coil 114 can be removed, and the armature 300 stays "unlatched" from the proximal pole piece 302 in a stable position.

With this configuration, the second polarity electric signal from the controller 122 is applied to the solenoid coil 114 for a particular period of time to move the armature 300 back to the unlatched position and is then removed. As an example for illustration, the controller 122 applies a 16 volts (V) DC signal for a period of about 100 milliseconds (ms) to the solenoid coil 114 and the signal is then removed, while the armature 300 remains unlatched from the proximal pole piece 302. This way, power loss does not affect the commanded state of the valve assembly 102.

The second commanded state achieved when a DC signal with the second polarity is provided to the solenoid coil 114 can be referred to as an "unlatched state" and is depicted in FIGS. 3 and 5-6. At the unlatched state, the proximal end of the armature 300 is secured against the interior surface of the manifold 104.

As depicted in FIG. 3, when the armature 300 presses against the interior surface of the manifold 104, the seal element 606 is compressed to effectively seal the longitudinal channel 608 of the manifold 104, thereby blocking fluid flow from the source 110. On the other hand, the distal end of the armature 300 disengages from the proximal pole piece 302 and the channel 310 is exposed (i.e., the seal element 344 no longer seals the channel 310).

As depicted in FIG. 3, the armature 300 includes one or more ridges, such as ridge 346 on an exterior surface of the armature 300. Alternatively, the armature 300 can include longitudinal slots or channels, rather than ridges. As such, fluid from the fluid consumer 112 (e.g., pressurized fluid from the fluid consumer 112 or trapped pressure in the fluid line connecting the outlet port 108 to the fluid consumer 112) is allowed to flow from the fluid consumer to the vent port 116.

Particularly, fluid flows from the outlet port 108 through the channel 342 and the channel 330 to the outer chamber 328, then through the window 326 to the inner chamber 320, then through the ridge 346 (between the exterior surface of the armature 300 and the interior surface of the solenoid coil 114) to the airgap 306, then through the channel 310, the hole 312, and the channel 314 to the gap 316, and then through the porous plug 318 to an external environment of the valve assembly 102. Thus, in the second commanded or unlatched state, the outlet port 108 is vented through the vent port 116 to the external environment of the valve assembly 102.

The valve assembly 102 can therefore be referred to as "bistable" as the armature 300 remains stable in the first commanded state or the second commanded state upon removing the electric signal. However, during operation of a vehicle or machine comprising the system 100 and the valve assembly 102, the valve assembly 102 may be subjected to external shock loads or vibrations. For example, if a truck includes the system 100 and a sudden load is dropped on a bed of the truck, a large shock load may be transmitted to the valve assembly 102. As another example, the truck may be driven through a bumpy road, and the vibrations to which the truck is subjected as it traverses the bumpy road are transmitted to the valve assembly 102.

Under such operating conditions, there is a potential that the vibrations or shock loads cause the armature 300 to unintentionally move. As an example for illustration, if the valve assembly 102 is operated in the second commanded state shown in FIG. 3 and is subjected to a sufficiently large shock load, the armature 300 may be nudged in the distal direction. If the armature 300 moves a sufficient distance in the distal direction such that the magnetic force of the magnet 308 increases to a level where it overcomes the biasing force of the spring 322, the armature 300 may be unintentionally latched to the proximal pole piece 302 even though a command signal with the first polarity has not been provided to the solenoid coil 114. Thus, while the valve assembly 102 is commanded and is expected to operate in the second commanded state, it unintentionally and undesirably switches to the first commanded state. Such un-commanded or unintentional switching from one commanded state to another may affect the stability of operation of the valve assembly 102 and may be undesirable.

To alleviate such unintentional switching or operating the valve assembly 102 in an un-commanded state, the system 100 is configured such that the controller 122 resends the last commanded signal periodically or intermittently at a particular frequency. For example, the controller 122 sends a DC signal with the second polarity to the solenoid coil 114 and applies the command signal for a particular period of time (e.g., 100 ms) then removes the command signal. As a result, valve assembly 102 operates in the second commanded state depicted in FIG. 3 as described above. The controller 122 then resends the commanded signal with the second polarity to the solenoid coil 114 at periodic time intervals (e.g., every particular time interval of about 1 second) and each time applies the command signal for the particular period for of time (e.g., 100 ms). This way, even if the armature 300 is dislodged or is moved unintentionally in the distal direction, the periodically-sent command signal forces the armature 300 back in the proximal direction to the commanded state or position.

If the controller 122 then receives input information indicating a request to switch to the first commanded state, the controller 122 sends a DC signal with the first polarity to the solenoid coil 114 and applies the command signal for a particular period of time then removes the command signal. As a result, valve assembly 102 operates in the first commanded state as described above where the armature 300 moves in the distal direction and is latched to the proximal pole piece 302. The controller 122 then resends the command signal with the first polarity to the solenoid coil 114 every particular time interval, and each time applies the command signal for the particular period for of time. This way, even if the armature 300 is dislodged or is moved back unintentionally in the proximal direction, the periodically-sent command signal forces the armature 300 in the distal direction to the commanded state or position.

As such, the controller 122 is configured to periodically resend the last commanded signal every particular time interval (e.g., every 1 second) and each time applies the signal for a particular period of time (e.g., for 100 ms).

Whenever the desired commanded state changes based on new input information to the controller 122, and the controller 122 responsively sends a different command signal, the different command signal becomes the last commanded signal that the controller 122 then resends every particular time interval (e.g., every 1 second).

In an example, the particular time interval at which the controller 122 resends the last commanded signal is longer than the particular period of time during which the signal is applied to the solenoid coil 114. In this example, there are some periods of time where no signal is applied to the solenoid coil 114 such that electric power is not continually provided to the solenoid coil 114, while at the same time reducing the potential of the valve assembly 102 unintentionally switching to an un-commanded state.

Also, in an example, the particular period of time during which the signal is applied and the time intervals between signal applications may differ based on the state being switched to. For instance, when switching to the first commanded state, the first polarity signal may be applied for a first period of time and then the signal is resent periodically every first time interval, and when switching to the second commanded state the second polarity signal may be applied for a second period of time and then the signal is resent periodically every second time interval. In examples, the first period of time may be equal to the second period of time and the first time interval may be equal to the second time interval. In other examples, the first period of time may be different from the second period of time and the first time interval may be different from the second time interval.

FIG. 7 is a flowchart of a method 700 for operating a valve assembly, in accordance with an example implementation. For example, the method 700 can be implemented by the controller 122 for operating the valve assembly 102 of the system 100.

The method 700 may include one or more operations, or actions as illustrated by one or more of blocks 702-706, 800-804. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 702, the method 700 includes receiving a first request to operate a valve assembly in a first commanded state, wherein the valve assembly comprises: (i) a manifold having an inlet port and an outlet port, (ii) a solenoid coil coupled to the manifold, wherein the solenoid coil includes a cavity therein and comprises a vent port, (iii) an armature slidably accommodated in the cavity of the solenoid coil, (iv) a proximal pole piece and a distal pole piece, (v) a magnet interposed between the proximal pole piece and the distal pole piece, wherein the magnet applies a magnetic force on the armature in a distal direction, and (vi) a spring applying a biasing force on the armature in a proximal direction.

At block 704, the method 700 includes, responsively, sending a first signal having a first polarity to the solenoid coil such that the first signal is applied to the solenoid coil for a first period of time (and the first signal is then removed), thereby causing a solenoid force to be applied to the armature in the distal direction, wherein a combination of the magnetic force and the solenoid force overcome the biasing force, causing the armature to move axially in the distal direction to a first position (the latched position), thereby allowing fluid flow from the inlet port to the outlet port, wherein when the armature is in the first position, the magnetic force of the magnet is greater than the biasing force, and the armature remains in the first position upon removal of the first signal.

At block 706, the method 700 includes resending the first signal periodically every first time interval, wherein the first time interval is greater than the first period of time.

The method 700 can further include any of the operations described throughout the disclosure.

Figure 8:
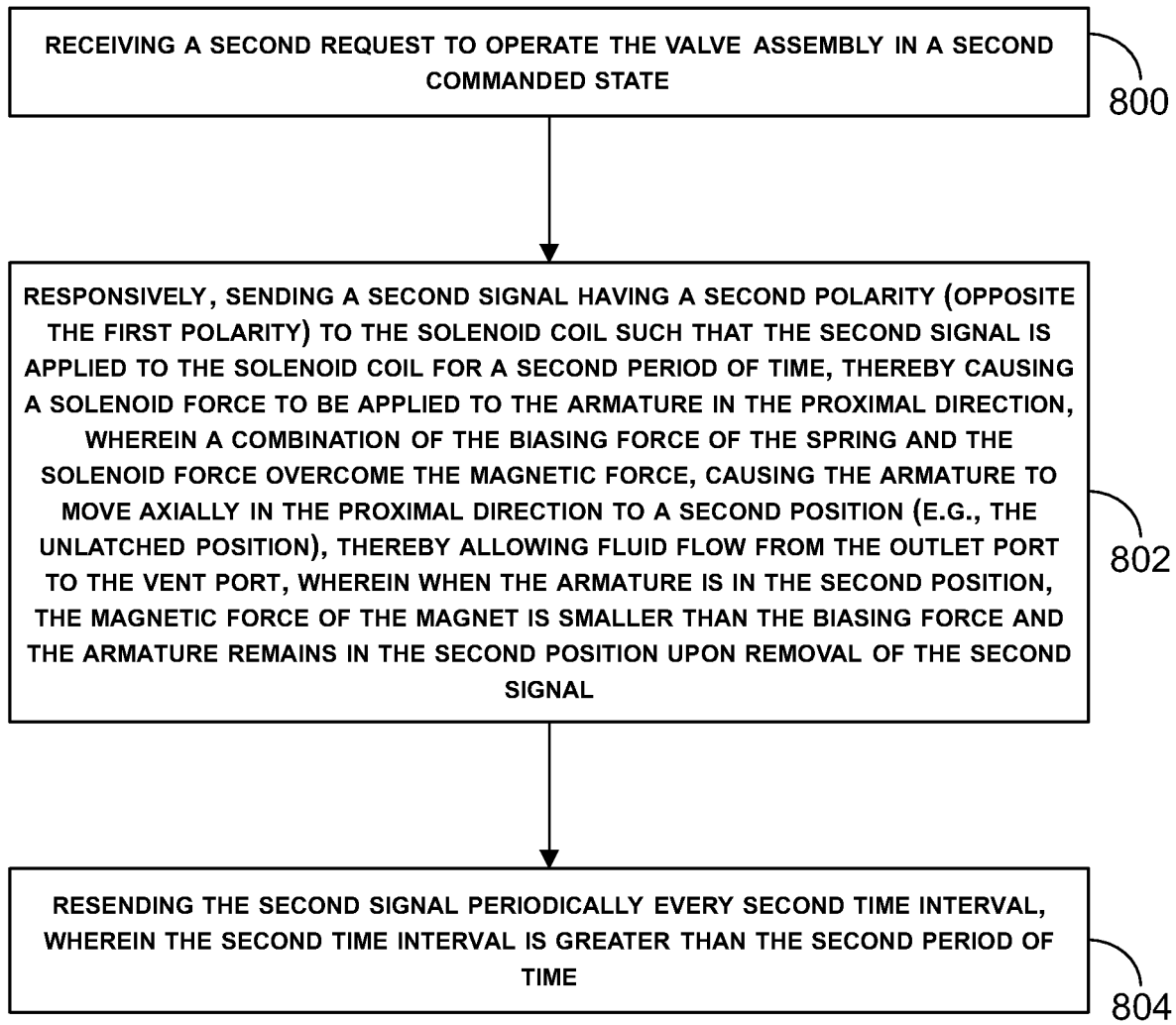
FIG. 8 is a flowchart of additional operations that may be executed and performed with the method of FIG. 7, in accordance with an example implementation.

FIG. 8 is a flowchart of additional operations that may be executed and performed with the method 700 of FIG. 7, in accordance with an example implementation. At block 800, operations include receiving a second request to operate the valve assembly in a second commanded state.

At block 802, operations include, responsively, sending a second signal having a second polarity (opposite the first polarity) to the solenoid coil such that the second signal is applied to the solenoid coil for a second period of time, thereby causing a solenoid force to be applied to the armature in the proximal direction, wherein a combination of the biasing force of the spring and the solenoid force overcome the magnetic force, causing the armature to move axially in the proximal direction to a second position (e.g., the unlatched position), thereby allowing fluid flow from the outlet port to the vent port, wherein when the armature is in the second position, the magnetic force of the magnet is smaller than the biasing force and the armature remains in the second position upon removal of the second signal.

At block 804, operations include resending the second signal periodically every second time interval, wherein the second time interval is greater than the second period of time.

In an example, the second time interval may be equal to the first time interval, and the second period of time may be equal to the first period of time.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A system comprising:
   a valve assembly comprising: (i) a plurality of ports including an inlet port, an outlet port, and a vent port, (ii) a solenoid coil having a cavity therein, (iii) an armature slidably accommodated in the cavity of the solenoid coil, (iv) a magnet fixedly disposed within the solenoid coil, wherein the magnet applies a magnetic force on the armature in a distal direction, and (v) a spring applying a biasing force on the armature in a proximal direction; and
   a controller configured to perform operations comprising:
      sending a signal having a particular polarity to the solenoid coil such that the signal is applied to the solenoid coil for a particular period of time, thereby causing a solenoid force to be applied to the armature in the proximal direction, wherein a combination of the biasing force of the spring and the solenoid force overcome the magnetic force, causing the armature to move axially in the proximal direction to a particular position, thereby allowing fluid flow from the outlet port to the vent port, while blocking fluid flow from the inlet port to the outlet port, and wherein when the armature is in the particular position, the magnetic force of the magnet is smaller than the biasing force, and the armature remains in the particular position upon removal of the signal, and
      resending the signal periodically every particular time interval, wherein the particular time interval is greater than the particular period of time.

2. The system of claim 1, wherein the valve assembly comprises a manifold, wherein the manifold includes the inlet port and the outlet port, wherein the solenoid coil is coupled to the manifold, and wherein the solenoid coil includes the vent port.

3. The system of claim 2, wherein the armature comprises a seal element within a proximal end of the armature, wherein the seal element is made of a flexible material such that when the armature is in the particular position, the seal element is compressed against an interior surface of the manifold and seals a channel that is fluidly coupled to the inlet port.

4. The system of claim 1, wherein the valve assembly further comprises: a proximal pole piece and a distal pole piece, wherein the proximal pole piece and the distal pole piece are fixedly disposed within the solenoid coil, and wherein the magnet is interposed between the proximal pole piece and the distal pole piece.

5. The system of claim 1, wherein the spring is a conical spring having a largest-diameter coil resting against and interior surface of the solenoid coil and a smallest-diameter coil resting against a flange formed at a proximal end of the armature.

6. The system of claim 1, wherein the valve assembly further comprises a porous plug disposed at the vent port formed at a distal end of the solenoid coil, wherein the porous plug allows flow of pressurized fluid therethrough in a direction from within the valve assembly to an external environment of the valve assembly.

7. The system of claim 1, wherein the signal is a first signal, the particular polarity is a first polarity, the particular period of time is a first period of time, the particular position is a first position, and the particular time interval is a first time interval, wherein the controller is configured to perform further operations comprising:
   receiving a request to change a commanded state of the valve assembly;
   responsively, sending a second signal having a second polarity, opposite the first polarity, to the solenoid coil such that the second signal is applied to the solenoid coil for a second period of time, thereby causing a respective solenoid force to be applied to the armature in the distal direction, wherein a combination of the magnetic force and the respective solenoid force overcome the biasing force of the spring, causing the armature to move axially in the distal direction to a second position, thereby allowing fluid flow from the inlet port to the outlet port, while blocking fluid flow from the outlet port to the vent port, and wherein when the armature is in the second position, the magnetic force of the magnet is greater than the biasing force of the spring, and the armature remains in the second position upon removal of the second signal; and
   resending the second signal periodically every second time interval, wherein the second time interval is greater than the second period of time.

8. The system of claim 7, wherein the second time interval is equal to the first time interval, and wherein the second period of time is equal to the first period of time.

9. The system of claim 7, wherein the valve assembly further comprises: (i) a proximal pole piece having a channel therein, and (ii) a distal pole piece having a respective channel therein, wherein the proximal pole piece and the distal pole piece are fixedly disposed within the solenoid coil, wherein the magnet is interposed between the proximal pole piece and the distal pole piece, and wherein the magnet is ring-shaped and includes a hole that is aligned with the channel and the respective channel.

10. The system of claim 9, wherein the magnet is axially-magnetized such that a north pole of the magnet is oriented in the distal direction toward the distal pole piece.

11. The system of claim 9, wherein the hole of the magnet, the channel of the proximal pole piece, and the respective channel of the distal pole piece form a fluid passage that fluidly couples an airgap formed between the armature and the proximal pole piece to a gap that separates the distal pole piece from a porous plug disposed at the vent port, wherein when the armature is in the first position, fluid from the outlet port flows to the airgap, then through the fluid passage and the porous plug at the vent port to an external environment of the valve assembly.

12. The system of claim 11, wherein the armature comprises one or more ridges that allow fluid flow from the outlet port to the airgap.

13. The system of claim 11, wherein the armature comprises a seal element within a distal end of the armature, wherein the seal element is made of a flexible material such that when the armature is in the second position, the seal element is compressed against the proximal pole piece and seals the channel of the proximal pole piece, thereby blocking the fluid passage.

14. A method comprising:
receiving a request to operate a valve assembly in a commanded state, wherein the valve assembly comprises: (i) a plurality of ports including an inlet port, an outlet port, and a vent port, (ii) a solenoid coil having a cavity therein, (iii) an armature slidably accommodated in the cavity of the solenoid coil, (iv) a magnet fixedly disposed within the solenoid coil, wherein the magnet applies a magnetic force on the armature in a distal direction, and (v) a spring applying a biasing force on the armature in a proximal direction;
responsively, sending a signal having a particular polarity to the solenoid coil such that the signal is applied to the solenoid coil for a particular period of time, thereby causing a solenoid force to be applied to the armature in the distal direction, wherein a combination of magnetic force and the solenoid force overcome the biasing force of the spring, causing the armature to move axially in the distal direction to a particular position, thereby allowing fluid flow from the inlet port to the outlet port, while blocking fluid flow from the outlet port to the to the vent port, and wherein when the armature is in the particular position, the magnetic force of the magnet is greater than the biasing force, and the armature remains in the particular position upon removal of the signal; and
resending the signal periodically every particular time interval, wherein the particular time interval is greater than the particular period of time.

15. The method of claim 14, wherein the request is a first request, the commanded state is a first commanded state, the signal is a first signal, the particular polarity is a first polarity, the particular period of time is a first period of time, the particular position is a first position, and the particular time interval is a first time interval, and wherein the method further comprises:
receiving a second request to operate the valve assembly in a second commanded state;
responsively, sending a second signal having a second polarity, opposite the first polarity, to the solenoid coil such that the second signal is applied to the solenoid coil for a second period of time, thereby causing a respective solenoid force to be applied to the armature in the proximal direction, wherein a combination of the biasing force of the spring and the solenoid force overcome the magnetic force of the magnet, causing the armature to move axially in the proximal direction to a second position, thereby allowing fluid flow from the outlet port to the vent port, while blocking fluid flow from the inlet port to the outlet port, and wherein when the armature is in the second position, the magnetic force of the magnet is smaller than the biasing force, and the armature remains in the second position upon removal of the second signal; and
resending the second signal periodically every second time interval, wherein the second time interval is greater than the second period of time.

16. The method of claim 15, wherein the second time interval is equal to the first time interval, and wherein the second period of time is equal to the first period of time.

17. The method of claim 15, wherein the valve assembly further comprises: (i) a proximal pole piece having a channel therein, and (ii) a distal pole piece having a respective channel therein, wherein the proximal pole piece and the distal pole piece are fixedly disposed within the solenoid coil, wherein the magnet is interposed between the proximal pole piece and the distal pole piece, and wherein the magnet is ring-shaped and includes a hole that is aligned with the channel and the respective channel.

18. The method of claim 17, wherein the hole of the magnet, the channel of the proximal pole piece, and the respective channel of the distal pole piece form a fluid passage that fluidly couples an airgap formed between the armature and the proximal pole piece when the armature is in the second position to a gap that separates the distal pole piece from a porous plug disposed at the vent port, wherein when the armature is in the second position, fluid from the outlet port flows through the fluid passage and the porous plug at the vent port to an external environment of the valve assembly.

19. The method of claim 18, wherein the valve assembly comprises a manifold, wherein the manifold includes the inlet port and the outlet port, wherein the solenoid coil is coupled to the manifold, and wherein the solenoid coil includes the vent port, wherein the armature comprises (i) a first seal element within a distal end of the armature, wherein the first seal element is made of a flexible material such that when the armature is in the first position, the first seal element is compressed against the proximal pole piece and seals the channel of the proximal pole piece, thereby blocking the fluid passage, and (ii) a second seal element within a proximal end of the armature, wherein the second seal element is made of the flexible material such that when the armature is in the second position, the second seal element is compressed against an interior surface of the manifold and seals a channel that is fluidly coupled to the inlet port.

20. The method of claim 14, wherein the spring is a conical spring having a largest-diameter coil resting against and interior surface of the solenoid coil and a smallest-diameter coil resting against a flange formed at a proximal end of the armature, such that as the armature moves in the distal direction to the particular position, the conical spring is compressed.

* * * * *